May 14, 1963     M. H. FELDMAN ETAL     3,089,189
APPARATUS AND PROCESS FOR FORMING HIGH DENSITY COMPACTS
Filed Aug. 7, 1959
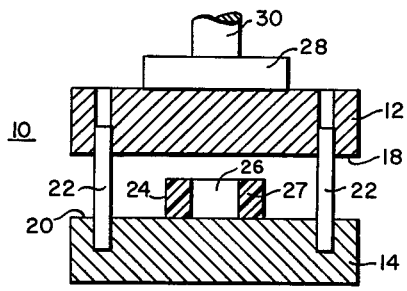
Fig. 1.
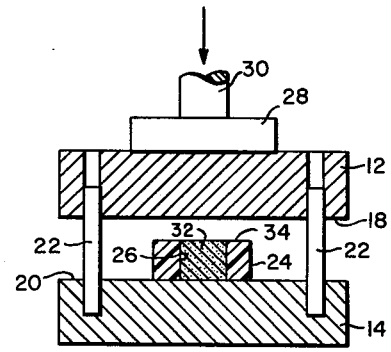
Fig. 2.
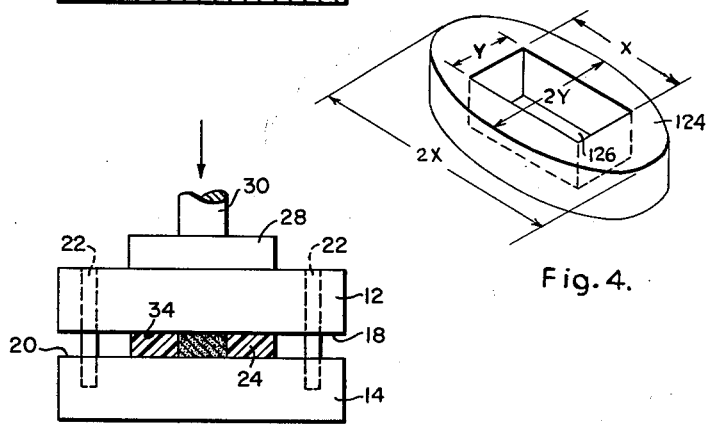
Fig. 3.
Fig. 4.
WITNESSES
Edwin E. Basler
Charles L. Menzemer
INVENTORS
Milton H. Feldman &
Harold E. Hosticka
BY
Frederick Shopoe
ATTORNEY

United States Patent Office 3,089,189
Patented May 14, 1963

3,089,189
APPARATUS AND PROCESS FOR FORMING HIGH DENSITY COMPACTS
Milton H. Feldman and Harold E. Hosticka, Pittsburgh, Pa., assignors to Westinghouse Electric Corporation, East Pittsburgh, Pa., a corporation of Pennsylvania
Filed Aug. 7, 1959, Ser. No. 832,390
8 Claims. (Cl. 18—16)

This invention relates to apparatus for molding articles, and more particularly to apparatus for producing compacts of high density and green strength from compactible materials.

An object of the present invention is to provide an apparatus for producing high density compacts from compactible materials disposed in an elastomeric die disposed between relatively movable press platens.

Another object of the present invention is to provide an apparatus for producing high density compacts without the use of binding or lubricating agents from compactible metals.

Another object of the present invention is to provide apparatus for producing high density compacts by subjecting compactible materials to a pressure of at least $1 \times 10^6$ pounds per square inch.

Another object of the present invention is to provide an apparatus for producing high density compacts comprising two plates of a hard material with a body of an elastomeric material, with a die cavity therein, disposed therebetween.

Other objects of the present invention will, in part, be obvious and will, in part, appear hereinafter.

For a better understanding of the nature and objects of the invention, reference should be had to the following detailed description and drawing in which:

FIGURES 1 to 3 inclusive are side views partially in cross section of a press, in varying operating positions, incorporating the teachings of this invention; and FIG. 4 is a perspective view of a die member suitable for use in accordance with the teachings of this invention.

In accordance with the present invention and attainment of the foregoing objects, there is provided apparatus for forming high density compacts from a compactible material, comprising a first member and a second member each having opposed flat surfaces movable toward each other, said first and second members being comprised of a hard relatively non-deformable material and a third member comprised of an elastomeric material selected from the group consisting of natural rubber and synthetic resins disposed upon one surface of said second member, an inner wall of said third body forming a die cavity therein, a means for imparting relative closing motion between said first and said second member in a direction perpendicular to said one surface of said second body, whereby, said third body, and at least one compactible material within the die cavity thereof, is compressed between said first and second member.

More specifically, and with reference to FIG. 1 there is shown a compacting apparatus or press 10 comprised of a first or top platen member 12 and a second or bottom platen member 14. The members 12 and 14 may be of any hard non-deformable material, for example, steel, tungsten carbide, boron nitride or the like. They may be comprised of a steel with an insert of a harder material, for example, tungsten carbide, inserted in a steel or other metal platen for attaining the highest pressures and to compact the hardest materials. The surface 18 of member 12 and surface 20 of member 14 are substantially parallel to each other.

Two or more guide rods 22 fixed to member 14 pass through member 12 to aid in positioning one member relative to the other when the press is being closed. While the drawings illustrate the rods 22 as passing through member 12 and terminating in member 14, it will be understood that this arrangement is not considered to be critical and any other suitable arrangement in accordance with the overall teachings of this invention would be considered satisfactory.

A third die member 24 is disposed upon surface 20 of member 14. Die member 24 may be comprised of any resilient elastomeric plastic material selected from the group consisting of natural rubber and synthetic resins, for example, neoprene rubber, Buna rubber, GR–S rubber, silicone rubbers, nylon, mixtures of natural rubber and synthetic resins, and mixtures of the synthetic resins. Ductile metals, for example lead and soft copper may also be used. Particularly satisfactory results have been realized using neoprene rubber.

Member 24 has a die cavity 26 substantially centrally disposed therein. The thickness of wall 27 surrounding die cavity 26 should be at least substantially equal to the radius of the cavity 26 when the cavity is of circular configuration. When the configuration of the die cavity is a rectangle as shown in FIG. 4, the most satisfactory results have been obtained when member 124 is of an elliptical configuration. The major diameter of the ellipse being equal to twice the length of the longest side of the die cavity 126 and the minor diameter being equal to twice the length of the shortest side of the die cavity 126.

A piston 28 connected to a rod 30 which in turn is connected to a source of pressure (not shown) is disposed upon a surface of member 12 in such a manner as to be capable of moving member 12 in a vertical direction that is, both upwardly and downwardly toward member 14 which is relatively fixed. It will be understood however, that the piston 28 and rod 30 may be disposed on member 14 in such a manner as to be capable of moving member 14 in an upward direction toward member 12. The mechanism by which members 12 and 14 are brought into close proximity is not considered an important part of this invention.

With reference to FIG. 2, in the utilization of the apparatus of this invention, the member 24 is disposed substantially centrally upon surface 20 of member 14. The die cavity 26 of member 24 is filled with a predetermined quantity of a compactible material 32, for example, metals, metalloids, metal oxides, magnetic oxides (ferrites), ceramics, metal hydrides, metal carbides, metal nitrides, cermets and mixtures thereof, in which the void volume is less than 50% of the total volume. Such compactible material may be in the form of a fine powder, dendritic particles, nodules or small pellets or mixtures thereof. The source of pressure (not shown herein) is activated driving the rod 30 and the piston 28 affixed to the upper surfaces of member 12. Member 12 is thereby forced in a downward direction toward member 14. As surface 18 of member 12 comes in contact with surface 34 of member 24, member 24 is compressed in a downward direction reducing its height and causing expansion in a sideward direction as illustrated in FIG. 3. It will be understood that rubber, for instance, is relatively incompressible, that is, there is little change in volume during compression. During the compression member 24 serves three functions relative to the compactible material 32. In the initial stage of compaction member 24 serves to retain the compactible material 32. In the middle stage member 24 exerts a circumferentially directed hydrostatic fluid pressure upon the compactible powder until full compaction is attained. In the concluding stage, member 24 serves as a container for the newly formed compact 34. When the pressure on member 12 is released the resilient member 24 tends to return substantially to its normal position. The compactible material has now been formed into a compact 34, and it may be easily removed from the resilient member 24 by flexing member 24, pushing or punching or any other suitable means.

It has been found that if the diameter of the die cavity is in the prescribed ratio to the wall thickness, the distortion of member 24 by compression will have substantially little effect upon the cross-section die cavity and a compact of close to or substantially the same dimensions as the die cavity 26 is produced.

It will be understood that the above description of the invention is only one suitable method which may be employed incorporating the teaching of this invention and that while the apparatus has been described in a manner wherein members 12 and 14 are moved in a vertical direction, one toward the other, the invention may be carried out by moving either member 12 or 14 or both in a horizontal direction toward each other. The only critical condition being, that member 24 be compressed between flat surfaces and that the indicated ratios between the diameter of the die cavity and wall thickness of the elastomeric die member be observed.

It should also be understood, that while the apparatus of this invention has been described above as a stationary piece of apparatus, it is quite conceivable that member 14 could be positioned on a conveyor belt and moved along either a horizontal or other plane, substantially approaching a vertical position, and guided to pass under a member such as member 12 and over a member such as member 14 which two members would be brought in contact with member 24 thereby, compressing it and compacting the compactible material 32 in the die cavity 26.

The following examples are illustrative of the practice of this invention.

*Example I*

An apparatus was constructed similar to that illustrated in FIG. 1. A top and bottom member, similar to members 12 and 14, respectively, in FIG. 1, each comprised steel blocks 3 inches x 3 inches x 1 inch.

An elastomeric member similar to member 24 of FIG. 1, was cut in a circular cylindrical configuration from a flat slab of neoprene rubber. The member had an outside diameter of 0.85 inch and a circular cavity disposed centrally therein having a diameter of 0.276 inch. The neoprene member had a height of 0.250 inch.

The elastomeric member was disposed upon one surface of one of the steel members, as illustrated in FIG. 1 and the cavity filled with zirconium nitride powder to a relative density of 24%.

The second steel member was then positioned upon the top of the elastomeric member and the assembly placed in a 50 ton hydraulic press. An increasing total load was applied over a period of 30 seconds to 90,000 pounds and held at the maximum for an additional 30 seconds. The elastomeric member and the zirconium nitride were compressed to 0.062 inch. The load of 90,000 pounds over an area of 0.06 square inch (area of the compact) resulted in a pressure of $1.5 \times 10^6$ pounds per square inch on the zirconium nitride. Most of the pressure was applied to the zirconium nitride compact since only a small part of the load was required to compress the elastomer alone.

The compacted zirconium nitride was about 0.062 inch thick and had a density of 97% of the theoretical density.

The compact had a metallic appearance and was so firmly bonded that it would scratch glass without attrition of the compact.

*Example II*

The procedure of Example I was repeated with the following exception.

The elastomeric member was cut in an elliptical configuration. The major diameter of the member was approximately 1 inch and the minor diameter approximately ½ inch. The cavity substantially centrally disposed within the member was of a rectangular configuration having a length along the major diameter of the member of ½ inch and a width of ¼ inch along the minor diameter of the member.

The compact produced had sharp corners and edges, a metallic appearance was able to scratch glass without attrition to itself.

While the invention has been described with reference to particular embodiments and examples, it will be understood that modifications, substitutions and the like may be made without departing from its scope.

We claim as our invention:

1. Apparatus for forming high density compacts from a compactible material, comprising a first platen member and a second platen member having substantially parallel surfaces, said first and second platen members being comprised of a hard relatively non-deformable material, a perforated third laterally unconfined unitary member consisting essentially of a resilient flowable elastomeric material disposed between the two platen members, the perforation extending through the third member and the wall of the perforation forming a die cavity into which a compactible material in the form of solid particles may be charged, the thickness of the wall surrounding said cavity being equal to at least the radius of said die cavity, means for imparting a relative closing motion between said first and second platen members in a direction perpendicular to said surfaces whereby said third member and the compactible material may be directly compressed between the surfaces of said first and second platen members into a dense compact, said third unconfined member exerting a circumferentially directed hydrostatic fluid pressure upon the compactible material during a part of the compaction period, the top and bottom surfaces of the elastomeric member being in direct contact with the platens during compaction.

2. Apparatus for forming high density compacts from a compactible material, comprising a first platen member and a second platen member, said first and second platen members being comprised of a hard relatively non-deformable material, a perforated third laterally unconfined unitary member consisting essentially of a resilient flowable elastomeric material selected from the group consisting of natural rubber and synthetic resins, selected from the group consisting of neoprene rubber, buna rubber, GR–S rubbers, silicone rubbers, and nylon, disposed upon one surface of said second member, the perforation extending through the third member and the wall of the perforation forming a die cavity into which a compactible material in the form of solid particles may be charged, the thickness of the wall surrounding said cavity at any point being equal to at least the radius of the die cavity at that point, means for imparting a relative closing motion between said first and second member in a direction perpendicular to said one surface of said second member whereby said third member is compressed between said first and second member and the compactible material is compressed into a compact, said third unconfined member exerting a circumferentially directed hydrostatic fluid pressure upon the compactible material during a part of the compaction period, the top and bottom surfaces of the elastomeric member being in direct contact with the platens during compaction.

3. Apparatus for forming high density compacts from a campactible material comprising, a first platen member and a second platen member, said first and second platen members being comprised of a hard relatively non-deformable material, a perforated third laterally unconfined unitary member consisting essentially of neoprene rubber disposed upon one surface of said second member, the perforation extending through a third member and the wall of the perforation forming a substantially circular die cavity therein into which a compactible material may be charged, the diameter of said die cavity being approximately equal to the thickness of the wall surrounding said cavity, a means for imparting a relative closing motion between said first and second members in a direction perpendicular to said one surface of said second member whereby said third member is compressed between said first and second member and the compactible material is compressed into a compact, said third unconfined member exerting a circumferentially directed hydrostatic fluid pressure upon the compactible material during a part of the compaction period, the top and bottom surfaces of the elastomeric member being in direct contact with the platens during compaction.

4. Apparatus for forming high density compacts from a compactible material comprising, a first platen member and a second platen member, said first and second platen members being comprised of a hard relatively non-deformable material, a perforated third laterally unconfined unitary member consisting essentially of neoprene rubber and having an elliptical configuration disposed upon one surface of said second member, the perforation extending through the third member and the wall of the perforation forming a substantially rectangular die cavity into which a compactible material may be charged, said third member having a major diameter equal to substantially twice the length of the longest side of the die cavity and a minor diameter equal to substantially twice the length of the shortest side of the die cavity, means for imparting a relative closing motion between said first and second members in a direction perpendicular to said one surface of said second member whereby said third member is compressed between said first and second member and the compactible material is compressed into a compact, said third unconfined member exerting a circumferentially directed hydrostatic fluid pressure upon the compactible material during a part of the compaction period, the top and bottom surfaces of the elastomeric member being in direct contact with the platens during compaction.

5. A method for fabricating a body of uniform high density from at least one campactible material in the form of solid particles which comprises (1) charging the compactible material in solid particle form into a die cavity comprised of a perforation within a resilient flowable elastomeric member, the thickness of the wall surrounding said cavity being equal to at least the radius of the cavity, (2) positioning said elastomeric member with the charged compactible material between two platens comprised of a hard relatively non-deformable material with the perforation extending from one platen to the other, (3) applying a pressure of the order of $1 \times 10^6$ pounds per square inch over the area of said compactible material by compressing said elastomeric member and said compactible material between said platens without confining the periphery of the elastomeric member, said elastomeric member being in direct contact with the platens during compaction, whereby a compact of uniform high density is formed.

6. A method for fabricating a body of uniform high density from at least one compactible material in the form of solid particles which comprises (1) charging the compactible material in solid particle form into a die cavity within a resilient elastomeric plastic member, the thickness of the wall surrounding said cavity at any point being equal to at least the radius of said cavity at that point, and (2) applying to said plastic member and said compactible material a load which equals a pressure of at least the order of $1 \times 10^6$ pounds per square inch based on the area of the cavity, said plastic member being free to flow laterally during the application of said load, said elastomeric member being in direct contact with the platens during compaction, whereby a compact of uniform density is formed.

7. A method of fabricating a body of uniform high density from at least one compactible material selected from the group consisting of metals, metalloids, metal oxides, ceramics, metal hydrides, metal carbides and metal nitrides, which comprises (1) charging the compactible material into a die cavity comprised of a perforation within a resilient flowable elastomeric member, the thickness of the wall surrounding said cavity being equal to at least the radius of the cavity, (2) positioning said elastomeric member with the charged compactible material between two platens comprised of a hard relatively non-deformable material with the perforation extending from one platen to the other, (3) applying a load which results in a pressure of the order of $1 \times 10^6$ pounds per square inch over the area of said compactible material by compressing said elastomeric member and said compactible material between said platens without confining the periphery of the elastomeric member, said elastomeric member being in direct contact with the platens during compaction whereby, a compact of uniform high density is formed.

8. A method for fabricating a body of uniform high density from at least one non-lubricated compactible powder of a material selected from the group consisting of metals, metalloids, metal oxides, ceramics, metal hydrides, metal carbides and metal nitrides, which comprises (1) charging the compactible material into a die cavity comprised of a perforation within a resilient flowable elastomeric member, the thickness of the wall surrounding said cavity being equal to at least the radius of the cavity, (2) positioning said elastomeric member with the charged compactible material between two platens comprised of a hard relatively non-deformable material with the perforation extending from one platen to the other, (3) applying a load which results in a pressure of the order of $1 \times 10^6$ pounds per square inch over the area of said compactible material by compressing said elastomeric member and said compactible material between said platens, without confining the periphery of the elastomeric member, said elastomeric member being in direct contact with the platens during compaction whereby, a compact of uniform high density is formed.

References Cited in the file of this patent
UNITED STATES PATENTS

| | | |
|---|---|---|
| 1,677,881 | Baish | July 24, 1928 |
| 2,059,520 | Harshberger | Nov. 3, 1936 |
| 2,172,243 | Goodnow et al. | Sept. 5, 1939 |
| 2,298,908 | Wentworth | Oct. 13, 1942 |
| 2,558,823 | Crowley et al. | July 3, 1951 |
| 2,668,328 | Porter | Feb. 9, 1954 |
| 2,691,801 | Robb | Oct. 19, 1954 |
| 2,886,433 | Blainey | May 12, 1959 |
| 2,953,819 | Holoubek et al. | Sept. 27, 1960 |